US012631283B2

(12) United States Patent
Cramer

(10) Patent No.: US 12,631,283 B2
(45) Date of Patent: May 19, 2026

(54) METHOD FOR PRODUCING A POLYMER-IMPROVED PIPE ELEMENT

(71) Applicant: Minimax Viking Patent Management GmbH, Bad Oldesloe (DE)

(72) Inventor: Thomas Cramer, Bad Oldesloe (DE)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 404 days.

(21) Appl. No.: 18/257,821

(22) PCT Filed: Dec. 23, 2021

(86) PCT No.: PCT/EP2021/087499
§ 371 (c)(1),
(2) Date: Jun. 15, 2023

(87) PCT Pub. No.: WO2022/136644
PCT Pub. Date: Jun. 30, 2022

(65) Prior Publication Data
US 2024/0102598 A1 Mar. 28, 2024

(30) Foreign Application Priority Data
Dec. 23, 2020 (EP) .................................... 20216864

(51) Int. Cl.
*F16L 58/10* (2006.01)
*F16L 41/08* (2006.01)
(52) U.S. Cl.
CPC ......... *F16L 58/1009* (2013.01); *F16L 41/082* (2013.01)
(58) Field of Classification Search
None
See application file for complete search history.

(56) References Cited

U.S. PATENT DOCUMENTS 4,132,339 A * 1/1979 Gurevich ............. B23K 31/027
228/103
4,323,223 A * 4/1982 Noll ....................... B23K 7/007
266/54
(Continued)

FOREIGN PATENT DOCUMENTS

DE 102018115525 1/2020
EP 0036571 9/1981
(Continued)

OTHER PUBLICATIONS

International Searching Authority, International Search Report with English translation, International Application No. PCT/EP2021/087499, 6 pages; Apr. 7, 2022.

*Primary Examiner* — Hua Lu
(74) *Attorney, Agent, or Firm* — Perkins Coie LLP

(57) ABSTRACT

A method and apparatus for the automated or partially automated production of a polymer-enhanced pipe element, which include: providing a first pipe section and a second pipe section, each having a connecting region; detecting in the connecting regions a three-dimensional shape of the first pipe section and the second pipe section; determining a spatial penetration curve as a function of a superposition of the three-dimensional shapes; determining a cut contour, as a function of the penetration curve, in each of the connecting regions of the first pipe section and the second pipe section; generating edge surfaces in the connecting regions of the first and second pipe sections along the respective cut contours; aligning the generated edge surfaces of the pipe sections; and welding the first and second pipe sections along the mutually aligned edge surfaces along the determined spatial penetration curve.

16 Claims, 12 Drawing Sheets

(56) References Cited

U.S. PATENT DOCUMENTS

| | | | | |
|---|---|---|---|---|
| 6,955,100 | B1* | 10/2005 | Barich | G01M 17/08 |
| | | | | 73/865.8 |
| 10,413,765 | B2 | 9/2019 | Rönpagel et al. | |
| RE48,284 | E | 10/2020 | Rönpagel et al. | |
| 10,823,880 | B1* | 11/2020 | Gupta | E02D 1/022 |
| 2002/0153355 | A1* | 10/2002 | Kazama | B23K 37/08 |
| | | | | 219/78.15 |
| 2006/0108795 | A1* | 5/2006 | Manzon | F16L 41/082 |
| | | | | 285/197 |
| 2007/0205672 | A1* | 9/2007 | Nozawa | H02K 15/03 |
| | | | | 310/12.24 |
| 2009/0189360 | A1* | 7/2009 | Fritz | B60G 15/063 |
| | | | | 280/5.519 |
| 2010/0032939 | A1* | 2/2010 | Crawford | B63C 7/006 |
| | | | | 285/18 |
| 2011/0155712 | A1* | 6/2011 | Dolzer | B23K 33/00 |
| | | | | 219/137 R |
| 2012/0111837 | A1* | 5/2012 | Al-Mostaneer | B23K 9/0284 |
| | | | | 219/73 |
| 2015/0174661 | A1* | 6/2015 | Brandstrom | B23K 37/0276 |
| | | | | 228/9 |

| | | | | |
|---|---|---|---|---|
| 2017/0182605 | A1* | 6/2017 | Rajagopalan | B23K 9/32 |
| 2018/0029154 | A1* | 2/2018 | Rajagopalan | B23K 9/0286 |
| 2018/0031152 | A1* | 2/2018 | Rajagopalan | F16L 9/02 |
| 2018/0117661 | A1* | 5/2018 | Konopacki | B23K 9/235 |
| 2018/0117718 | A1* | 5/2018 | Rajagopalan | B23K 9/0284 |
| 2018/0154466 | A1* | 6/2018 | Larikka | B23D 21/02 |
| 2018/0200551 | A1* | 7/2018 | Rönpagel | B05D 7/22 |
| 2020/0240555 | A1* | 7/2020 | Chuiko | F16L 58/1009 |
| 2021/0012680 | A1* | 1/2021 | Torrecilla | G09B 19/24 |
| 2021/0154506 | A1 | 5/2021 | Rönpagel et al. | |
| 2021/0254777 | A1 | 8/2021 | Rönpagel et al. | |
| 2021/0262594 | A1 | 8/2021 | Rönpagel et al. | |
| 2022/0049909 | A1* | 2/2022 | Hicks, II | F28D 7/06 |

FOREIGN PATENT DOCUMENTS

| | | |
|---|---|---|
| EP | 1 270 132 | 1/2003 |
| EP | 2 623 163 | 8/2013 |
| EP | 2 766 653 | 11/2016 |
| FR | 2311980 | 12/1976 |
| KR | 2019 0042233 | 4/2019 |
| WO | WO2020/002502 | 1/2020 |

* cited by examiner

METHOD FOR PRODUCING A POLYMER-IMPROVED PIPE ELEMENT

PRIORITY CLAIM AND INCORPORATION BY REFERENCE

This application is a 35 U.S.C. § 371 application of International Application No. PCT/EP2021/087499, filed Dec. 23, 2021, which claims the benefit of European Application No. 20216864.7, filed Dec. 23, 2020, each of which is incorporated by reference in its entirety.

BACKGROUND AND SUMMARY OF THE INVENTION

The invention relates to a method for the automated or partially automated production of a polymer-enhanced pipe element using pipe sections subject to tolerances.

The production of polymer-enhanced pipe elements for fire extinguishing systems is known, for example, from EP 2623163 B1, EP 2766653 B1 and WO 2020/002502 A1. The possibility of applying to the pipe a highly corrosion-inhibiting coating with long-term resistance by means of polymer enhancement is gaining in importance especially in areas of application in which it is increasingly important to have long-term resistance to corrosion for safety consider-ations. One example of such applications which may be highlighted is the use of polymer-enhanced pipe elements in fire extinguishing systems, but the uses of such polymer-enhanced pipe elements in industrial plants with corrosion-promoting media which have to be transported, or in cor-rosion-promoting environments, such as, inter alia, fluid line systems in maritime environments, are also increasingly relevant fields of application.

It is known that it is important for successful coating in polymer enhancement to avoid potential subsequent corro-sion foci in pipe production. It is also known, from the abovementioned documents for example, that pipe elements which consist of a plurality of pipe sections, such as, for example, main bodies and stubs attached laterally to them, are connected to one another by welding, wherein it is possible for such corrosion foci to be formed or for the coating to be formed incorrectly due to surface artifacts in the region of the weld seam as a result of impurities, deviations in shape and other aspects. It is furthermore known that, given complete root fusion in the welding process, most of such problem areas on the inside of the pipe can be eliminated quite reliably in the subsequent pickling process.

In practice, it has been found that the production of a pipe element from a plurality of pipe sections by means of welding faces particular challenges when use is made of pipes which are subject to tolerances and which can differ from pipe to pipe in terms of their wall thickness, roundness and pipe bending. However, the use of such pipes is desir-able for economic reasons and especially for applications in which very large quantities, i.e. pipe lengths, have to be processed.

It has therefore been an object of the invention to specify a method of the type designated at the outset in which the disadvantages described above are overcome as far as pos-sible. In particular, it was an object of the invention to provide a method of the type designated at the outset which permits economically advantageous production of pipe ele-ments without impairing the quality of the surface coating by means of polymer enhancement.

The invention achieves the object on which it is based, in a method of the type designated at the outset, in that it has the following steps:

- providing a first pipe section and a second pipe section, wherein the pipe sections each have a connecting region, which is provided for connection to the respec-tive other pipe section;
- detecting a three-dimensional shape of the first pipe section and a three-dimensional shape of the second pipe section, in each case in the connecting regions;
- determining a common spatial penetration curve as a function of a superposition of the three-dimensional shapes,
- determining a cut contour in the connecting region of the first pipe section and a cut contour in the connecting region of the second pipe section, in each case as a function of the common penetration curve;
- generating edge surfaces in the connecting regions of the first and second pipe sections along the respective cut contours;
- aligning the generated edge surfaces of the pipe sections with respect to one another; and
- welding the first and second pipe sections along the mutually aligned edge surfaces along the determined spatial penetration curve.

Pipes subject to tolerances are understood to mean, for example, pipes where the deviations in the outside diameter were up to +/−1%, which would correspond to a tolerance band of approximately 4 mm at a nominal diameter of DN 200. The tolerance of the pipe elements with respect to the wall thickness can be +/−10% in the case of pipes subject to tolerances in the sense according to the invention, and therefore the inner contour can also have a tolerance band of up to 0.4 mm in the case of a pipe of diameter DN 200. In the case of pipes subject to tolerances, the geometrical accuracy can be up to 2% and the deviation of the straight-ness can be 3 mm per meter.

The invention makes use of the realization that, by determining the spatial penetration curve on the basis of the three-dimensional shape of both pipe sections, it is possible to prepare a reference set for the shape to be introduced into both pipe sections, which set ensures exact shape-matching of the first and second pipe sections in their connecting region, irrespective of the tolerance-induced shape devia-tions that occur in practice.

With the invention, it is possible to process pipes which are already dimensioned and toleranced quite exactly ex works, but also pipes which have the tolerance ranges described above, or have even greater deviations than these. In other words, the common spatial penetration curve makes it possible to introduce the exact outer shape of the first pipe section as a cut edge into the second pipe section if the second pipe section is a stub and the first pipe section is an elongate base pipe. Conversely, the common penetration curve makes it possible to introduce the exact shape of the second pipe section as a cutout into the first pipe section.

The step of welding the first and second pipe sections is preferably carried out in a single continuous movement. This means that the welding device is applied and traverses the common spatial penetration curve in one pass until the weld seam is complete, without temporarily disengaging. The welding device preferably disengages only when the appli-cation point has been reached again and when, in particular, the root formations of the weld seam are connected to one another. A desired weld seam quality, for example class B according to DIN EN ISO 5817:2014 or analogous other standards, is thereby achieved by a reliable process. The procedure is made possible by the determination and subsequent use of the common spatial penetration curve. As a result, the weld seam formed in a single continuous pass is of more regular configuration than weld seams that are produced manually or semi-automatically can be, whereby in turn the ability of the pipe element to form a low-defect or defect-free surface coating by means of polymer enhancement is improved.

Preferred embodiments of the method according to the invention are described in the claims and in the following explanations.

In a first development of the method, the step of determining the three-dimensional shapes comprises providing an idealized model of the first pipe section and an idealized model of the second pipe section, and determining deviations of the detected shape of the pipe sections from a respective model. The idealized models are, for example, cylinders with the predetermined theoretical outside diameters of the pipe sections. The outside diameters are the quantity which is also recorded metrologically. In other words, it is the actual deviations of the pipe sections from their desired geometry which are detected in this method step.

In a development of the method, the step of determining the spatial penetration curve comprises providing or generating an idealized penetration curve of the idealized models, and generating the spatial penetration curve by applying the deviations of the three-dimensional shape to the idealized penetration curve.

In an alternative preferred embodiment, the step of determining the three-dimensional shapes comprises determining families of points for both pipe sections, wherein the families of points are situated on the respective surface of the pipe sections in the respective connecting region and characterize the three-dimensional shape of the pipe sections in the connecting regions, and wherein the step of determining the spatial penetration curve preferably further comprises forming the spatial penetration curve from the intersection of the families of points. In other words, according to this variant, those points are found which have the same coordinates in both families of points. If the two detection steps are not carried out in the same coordinate system, the families of points are preferably transposed into a common coordinate system.

The advantage of the invention is particularly apparent here: By means of the common spatial penetration curve, it is possible, in a partially automated or automated method, to carry out all the steps of the mechanical processing of the pipe sections, such as their positioning in the installation, the generation of the edges in the connecting regions for the subsequent welding process, the cleaning and dressing of the cut surfaces produced, and the welding itself, in each case on exactly the same path as a function of the spatial penetration curve. As a result, sources of error which could be associated with inaccurate positioning or could result from unforeseen shaping of the pipe sections are very largely ruled out.

The method is preferably developed in that it comprises the step of clamping the first pipe section by means of a clamping device, preferably in such a way that the first pipe section is received so as to be rotatable about an axis of rotation of the clamping device. In other words, the first pipe section is preferably clamped in such a way as to be rotatable about a defined instantaneous pole, which would represent the theoretical center of the pipe if this corresponded to an idealized cylinder. The rotary function can be implemented, for example, by rotating the entire clamping device about this pipe center axis, which also forms what is referred to as the tool center point (TCP) of the common coordinate system, or by rotating only the first pipe section. In principle, the method according to the invention can also be carried out if the pipe section is not rotatable.

As a further preference, the method comprises the steps of picking up the second pipe section by means of a handling device, in particular a handling robot, and positioning the second pipe section in a fixed position relative to the first pipe section. In a first preferred variant, the handling device holds the second pipe section continuously in the fixed position relative to the first pipe section until welding has been carried out. In a preferred second alternative, the second pipe section is held by means of the handling device only until it has been mechanically fixed in some other way relative to the first pipe section, for example by means of tack welding.

In a further preferred embodiment of the method, the step of generating the edge surfaces comprises cutting peripheral edge surfaces on the first and second pipe sections, preferably by means of plasma cutting, wherein edge surfaces on the first and second pipe sections are preferably cut with an inner edge and an outer edge in each case.

As a further preference, the edge surfaces on the first and second pipe sections are cleaned before the welding step.

As a further preference, the edge surface to be produced on the first pipe section is at a distance from the ends thereof and defines a cutout through the wall of the first pipe section, and the generating edge surface on the second pipe section is formed on an end of the second pipe section. In other words, the first pipe section is a base pipe having a lateral aperture at a distance from the end, and the second pipe section is a stub which is configured for lateral attachment to the first pipe section and is aligned flush with this cutout.

The first and second pipe sections are preferably aligned at an angle of 90°+/−0° to 5° to one another.

Alternatively or additionally, the first and second pipe sections are preferably aligned in such a way that they rest against each other without gaps or that there is a joining gap of 0.2 mm or less.

The method preferably further comprises the step, for the step of providing the first and second pipe sections, of scanning the marking of the pipe sections to be processed. Scanning corresponding markings in pipe sections makes it possible to implement acquisition of the (theoretical) nominal diameters, wall thicknesses etc. of the pipe sections to be processed for the automation of welding. This acquired information can be used, for example, for the automatic setup of the handling devices, the clamping device and so on.

In a further preferred embodiment, the step of welding the first and second pipe sections comprises welding the pipe sections along the penetration curve; forming a fully encircling weld seam which has a root extending to the inside of the pipe sections, wherein the root of the weld seam has a thickness such that at least one of the inner edges, and preferably both inner edges, is or are completely fused by the root, wherein the root of the weld seam completely fuses the inner edge of one of the pipe sections, and the remaining inner edge of the other pipe section is at a distance from the weld seam by a predetermined maximum value in the radial direction, wherein in particular the predetermined maximum value, a) if the first and second pipe sections have the same wall thickness, is less than or equal to half of a wall thickness of the pipe sections, particularly preferably less than or equal to one fourth of the wall thickness of the pipe sections, or b) if the first and second pipe sections have different wall thicknesses, is less than or equal to a difference between the wall thicknesses of the pipe sections, particularly preferably less than or equal to one half of the difference in the wall thickness of the pipe sections.

The method according to the invention preferably further comprises the step of applying a polymer-based layer to the inside of the pipe element, wherein the polymer-based layer completely covers the inside of the pipe element, wherein the application of the polymer-based layer is preferably accomplished by means of autodeposition, as a further preference by means of dipping the pipe element in a dip tank which contains an appropriate coating agent, in particular a polymer-based chemical autodeposition material. This method step, in which the polymer enhancement is added to the pipe, can be used successfully with various chemical autodeposition materials, for example. For example, epoxy-acrylic urethane coatings, such as Bonderite M-PP 930, have proven to be suitable in the past. The properties of these autodeposition materials are known, and these materials can be well managed in the coating process, even on an industrial scale. The autodeposition coating is described, for example, in the documents designated at the outset, the content of which is fully incorporated here.

The invention has been described above in a first aspect with reference to the method explained. In a further aspect, the invention further relates to an apparatus for the automated or partially automated production of a polymer-enhanced pipe element using pipe sections subject to tolerances, wherein the pipe sections each have a connecting region, which is provided for connection to the respective other pipe section.

The invention achieves the object on which it is based by virtue of the fact that the apparatus has at least one detection device for detecting a three-dimensional shape in each case in the connecting regions, a computing unit, which is configured to determine a spatial penetration curve as a function of a superposition of the detected three-dimensional shapes, and to determine cut contours in the connecting regions of the first and second pipe sections as a function of the penetration curve, a cutting device for producing edge surfaces in the connecting regions of the first and second pipe sections along the respective cut contours, and a welding device, which is configured to weld the first and second pipe sections to one another along the mutually aligned edge surfaces along the determined spatial penetration curve.

The apparatus makes use of the same advantages and preferred embodiments as the method according to the invention according to the first aspect, and therefore reference is made in this regard to the above statements in order to avoid repetitions. Preferred embodiments of the method are at the same time preferred embodiments of the apparatus and vice versa.

In a preferred development of the apparatus, the apparatus has a device for collecting welding, cutting-jet or other artifacts which are hurled away by the welding or cutting jet from the point of processing, for example welding spatter, displaced liquid metal from the process of plasma cutting, or flying chips, on the inside of the first and/or second pipe sections, which device is designed to be positioned in the connecting regions of the first and/or second pipe sections before welding, particularly preferably substantially opposite the welding or cutting location. This reduces or prevents damage to and contamination of the inner surface and thus also reduces the risk of impairment of the surface quality in the interior of the pipe.

For this purpose, the device preferably has a collecting container which is matched to the inside diameter of the first pipe section and is configured to collect as many of the above-mentioned artifacts as possible. The collection of the artifacts, which according to the invention is likewise carried out as part of a partially automated or automated process, is described in more detail, for example, in WO 2020/002486A1, the content of which is fully incorporated here.

In a preferred embodiment, the apparatus according to the invention has a clamping device for the first pipe section, and a handling device, in particular a handling robot, for the second pipe section.

The clamping device preferably has at least one clamping means, preferably a plurality of clamping means, and is configured to rotate the first pipe section about an axis of rotation, wherein the axis of rotation of the clamping device in its clamping position preferably runs through the origin of the coordinate system of the common spatial penetration curve, or wherein the common spatial penetration curve is transposed, if necessary, into the coordinate system, one axis of which represents the axis of rotation. If the first pipe section has already been clamped before the three-dimensional shape has been detected, the detection and thus also the determination of the common penetration curve can be performed directly in the correct coordinate system, making it possible to omit a transposition.

In a further preferred embodiment, the clamping means comprises a clamping center, which defines the axis of rotation of the clamping device. In further preferred embodiments, the above-described clamping means is a first clamping means and the clamping device further has a second clamping means, which is arranged at an axial distance from the first clamping means along the axis of rotation, wherein the clamping device is configured to clamp the first pipe section on both sides of the connecting region by means of the clamping means. In this case, it is basically advantageous to choose a distance between the clamping means which is as small as possible.

As a particular preference, the clamping means can be moved relative to one another in the direction of the axis of rotation, so that the clamping distance between the clamping means can be set as a function of the diameter of the second pipe section. The smaller the selected distance between the clamping means can be, the smaller is a wobbling movement of the first pipe section during its rotation. The wobbling movement arises inevitably because of a radial offset between the axis of rotation of the clamping device and the center of mass of the first pipe section, because the pipe section does not have an idealized cylindrical shape but is also subject to tolerances with regard to its straightness.

In addition, the pipe section is preferably clamped in accordance with the expected deformation of the pipe section as a result of the impending introduction of heat. The influence of the thermally induced deformation on the calculated welding path is thereby reduced.

This means that the deflection of the surface of the first pipe section is smaller in absolute terms, even in the case of curved pipe sections which do not extend in a straight line, and this facilitates the positional tracking of the handling device which is to carry out the welding operation.

In a further preferred embodiment, the clamping means is/are designed to be open on one side and is/are configured to receive and clamp the first pipe section from above. By designing the clamping means to be open on one side, two advantages are simultaneously achieved: On the one hand, the pipe elements can be inserted into the clamping device from above, making handling in automated production significantly easier and reducing the space requirement. On the other hand, the open region of the clamping device at the top can provide better access to the connecting section of the pipe sections for the handling device or devices.

In a further preferred embodiment, the first and/or second clamping means is/are configured to fix the pipe section, and the clamping device or the clamping means is or are configured to pivot the clamping means in such a way that the first pipe section rotates about the axis of rotation of the clamping device. It may be advantageous to allow the entire clamping device to rotate and to fix the clamping means relative to the clamping device.

In a preferred embodiment, the clamping means are designed as centrally clamping clamping devices, particularly preferably as steady rests.

In a further preferred embodiment, the clamping device has an arcuate guide along which the clamping means is movably received, wherein the guide is aligned concentrically relative to the axis of rotation and is configured to guide the clamping means around the axis of rotation. When using a plurality of clamping means, preferably at least one, preferably a plurality or all of the clamping means is or are arranged so as to be movable about the axis of rotation by means of a separate guide of this type.

In a further preferred embodiment, the handling device is a first handling device, and the apparatus further has a second handling device, in particular designed as a handling robot, which has a receptacle for various processing attachments. The attachments—also referred to as working heads—preferably comprise one or more of the following: to form the cutting device, a cutting torch, laser, water jet or a machining head for machining (including finish-machining of the cut edges, in particular for milling); as a cleaning device, an attachment for hammering, blasting, scraping, brushing or plasma blasting; to form the detection device, a mechanical surface probe, a dynamic pressure sensor, a plasma surface sensor, one or more optical sensors; to form the welding device, a welding head, for example a MIG, MAG or TIG welding head, or, in the case of brazing instead of welding, a brazing device.

The attachments preferably each have an assembly interface of corresponding design to the receptacle of the handling device, and have a point of action (tool center point). In the case of a marking pen, for example, the point of action is the marking tip, in the case of a welding attachment, the welding point, etc. As a particular preference, the point of action in the case of all the attachments is positioned identically relative to their assembly interface. This has the effect that, when guided along the same path by the handling device, the tools perform exactly the same movement through space with their point of action. This, in turn, has the effect that a plurality of tools, for example the measuring attachment, the cutting torch attachment and/or the welding attachment, can be guided by means of a single path. It is not necessary to program or calculate a separate path for each tool. In this preferred embodiment, therefore, it is only necessary to calculate the spatial penetration curve once, and this can then be used for all working steps despite any tool changes. As a result, considerable computing and time resources can be saved and manufacturing tolerances can be reduced at the same time.

The apparatus preferably has an electronic machine controller, which is connected in a signal-transmitting manner to the detection device, the computing unit, the cutting device, the welding device, and preferably one, more or all of the clamping device, the first and/or the second handling device and is configured to carry out the method according to any of the preferred embodiments described above.

The machine controller can be designed as a master control device, which communicates with one, several or all of the aforementioned devices in a signal-transmitting manner and controls them, or can have one or several sub-control units, which are each assigned to the above-described devices, and each carry out dedicated control of the respective units.

The program architecture will be adapted depending on the application and on the machine concepts available to the respective plant operators, it being possible, for example, for the electronic machine controller, as a master controller, to control two mechanical systems, each with a CNC control system.

The machine controller preferably has a higher-level programmable logic controller (PLC), as well as a human-machine interface, and further preferably functional units such as an order management unit and a control unit for the peripheral devices of the apparatus. The two mechanical systems each have a dedicated CNC control system and a handling device designed as a six-axis robot. The first mechanical system is preferably responsible for the first pipe section and the second mechanical system is responsible for the second pipe section.

The first mechanical system preferably has a positioning device for the pipe, which has the clamping device, as well as a sensor system for surface measurement, which has the detection device. Furthermore, the first mechanical system has processing hardware for cutting the first pipe section and for welding the pipe connection between the two pipe sections, both of which are preferably operated by means of the handling device.

The second mechanical system preferably likewise has a handling device designed as a six-axis robot, and is responsible for the handling and positioning of the second pipe section, preferably a pipe stub. The second mechanical system also preferably has a sensor system for surface measurement, which represents the detection device, as well as the hardware for cutting the second pipe section to shape and for positioning the stub for joining or for joining itself, if necessary.

The invention has been described above on the basis of the first and second aspects with reference to the method according to the invention and the apparatus according to the invention. The invention further relates to a computer program product, comprising commands which, when the program is executed by a computer, preferably by the machine controller of the apparatus, cause it then to carry out the steps of the method according to any one of the preferred embodiments described above.

The invention further relates to a computer-readable storage medium comprising instructions which, when the instructions are executed by a computer, preferably by the machine controller of the apparatus described above, cause it then to carry out the steps of the method according to any one of the preferred embodiments described above.

The invention further relates to the use of a pipe element produced by means of a method according to one of the above-described preferred embodiments or by means of an apparatus according to one of the above-described preferred embodiments in a pipe conduit system of a fire extinguishing system. Alternatively, the invention relates to such a use of a pipe element in a pipe conduit system of a watercraft, or as a gas or liquid line in an industrial enterprise, for example in a marine environment.

The advantages of the invention come into play wherever stainless steel pipe conduits have always been used in the past for reasons of corrosion protection. By managing the welding process, it offers the possibility of significantly increasing safety and economy in the construction of such systems, even in the case of pipes subject to tolerances, without any loss of corrosion resistance.

The invention further relates to a polymer-enhanced pipe element which has a first pipe section and a second pipe section, which are connected to one another by means of a continuous weld seam and are coated with a polymer-based layer at least on the inside of the pipe, but preferably on the inside of the pipe and on the outside of the pipe, wherein the polymer-based layer is chemically bonded to the material of the pipe element, and preferably contains a polymer-based autodeposition material.

The pipe element incorporates the advantages of the method and the apparatus of the two aspects mentioned herein. Preferred embodiments of the method and of the apparatus are at the same time preferred embodiments of the pipe element and vice versa.

By virtue of the fact that the first and second pipe sections have been welded in a continuous, i.e. a single uninterrupted, movement, the pipe element has a specially shaped weld seam which—as explained above—is formed more regularly than weld seams produced manually or semi-automatically can be. By virtue of its production in a single pass, the weld seam has, in particular, exactly one application point, at which the disengagement point is simultaneously located. Regular formation can be checked visually, both externally and internally (see also the above explanations for root fusion) on the pipe element, and with it also the ability of the pipe element to form a low-defect or defect-free surface coating by means of polymer enhancement.

In the first pipe section, the pipe element preferably has a nominal diameter in a range of from DN 16 to DN 500, more preferably in a range of from DN 20 to DN 300, particularly preferably DN 32 to DN 65, wherein the nominal diameter of the second pipe section is less than or equal to the nominal diameter of the first pipe section.

The first pipe section preferably has a flattened surface in one wall region, preferably in that region in which the weld seam is formed.

The wall thickness of the pipe sections is preferably in a range between 2 mm and 10 mm, preferably in a wall thickness range of 5 mm to 6 mm.

It should be noted at this point that it is possible with the method according to the invention to produce pipe elements with significantly greater wall thicknesses because the method according to the invention described above can also be carried out with multi-layer welding, guided once again by means of the spatial penetration curve, in which case it is also quite possible for wall thicknesses in a range of from 30 mm to 40 mm to be connected to one another. Each of the welding layers benefits from the possibility of uninterrupted, continuous welding without temporary disengagement owing to improved uniformity, which manifests itself, inter alia, in less pronounced scaling.

As an alternative to a welding process, the method according to the invention and the apparatus according to the invention can also be used to braze thin-walled pipes.

The pipe element produced by the method according to the invention or the apparatus according to the invention preferably has a polymer finish with a layer thickness in a range of from 7 μm to 80 μm, preferably in a range of from 7 μm to 30 μm, wherein the layer thicknesses refer to the dry layer thickness and, in particular, the layer thickness increase relative to the untreated state.

In the region of the connecting region and toward the ends of the pipe, the layer thicknesses are preferably greater than in the central regions, which are at a distance both from the one end and from the other end of the pipe sections.

BRIEF DESCRIPTION OF THE DRAWINGS

The invention is described in more detail below with reference to the accompanying figures and with reference to possible exemplary embodiments. Here.

DETAILED DESCRIPTION OF THE INVENTION

Figure 1:
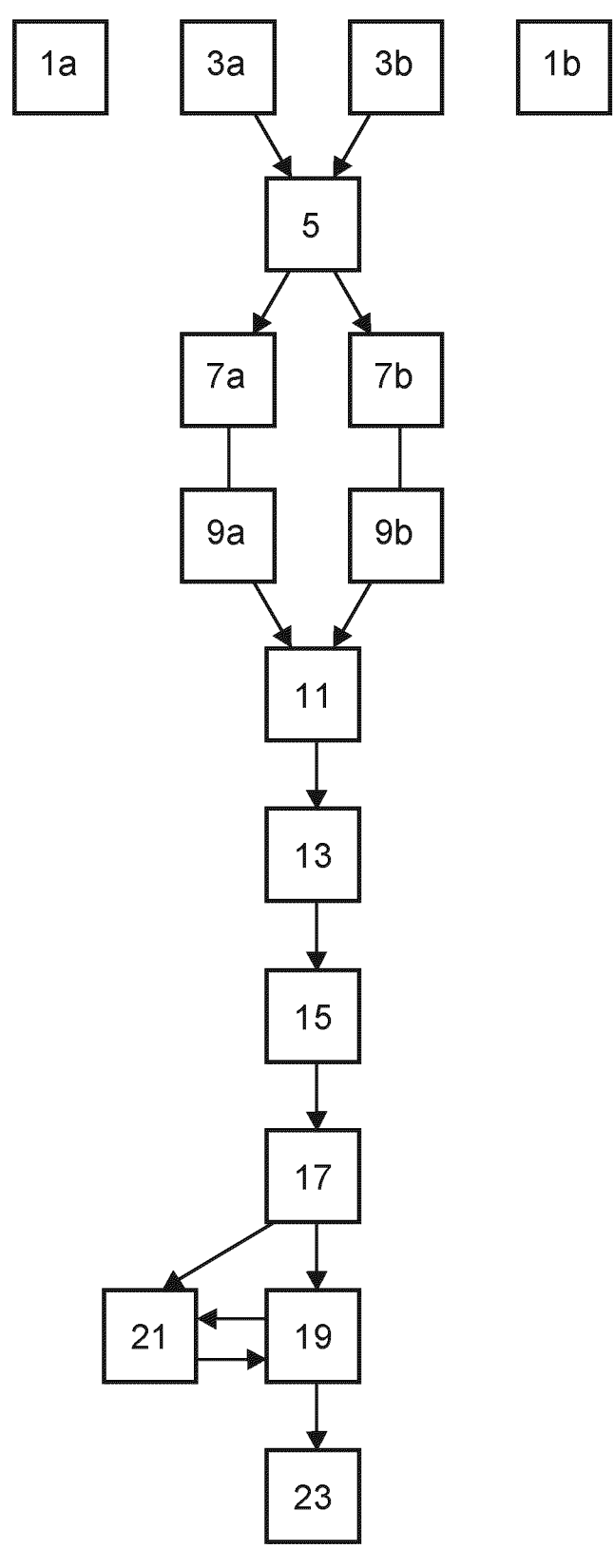
FIG. 1 shows an automatic method flow diagram of the method according to the invention for producing a pipe element according to a preferred exemplary embodiment.

FIG. 1 shows a schematic sequence of one possible embodiment of the method according to the invention for producing a polymer-enhanced pipe element 100 (FIG. 2). First, in steps 1a, 1b, a first pipe section 101 and a second pipe section 102 are provided. The first pipe section 101 is, for example, a base pipe, and the second pipe section 102 is a pipe stub which is to be welded to the first pipe section 101 as a lateral outlet.

Following this, in a next method step 3a, 3b, the three-dimensional shape of the first and of the second pipe section 101, 102 is detected, which shape is to form the subsequent connecting region of the pipe sections 101, 102. In particular, the surfaces of the pipe sections 101, 102 to be connected to one another are scanned in order to detect any deformations or irregularities in the configuration of the pipe element.

Between steps 1 and 3, the first pipe section 101 is preferably clamped in a clamping device, for example a clamping device 40 according to the second aspect of the invention. This is described in more detail below. Furthermore, the second pipe section is preferably picked up by means of a handling device, such as a (first) handling device 52, which is designed as a handling robot, cf. FIG. 8b.

The three-dimensional shape of the first pipe section 101 is detected, for example, by means of a stationary detection device (not illustrated), along which the pipe section 101 is guided, or by means of a (second) handling device 50, which can be designed as a handling robot.

The three-dimensional shape of the second pipe section 102 is detected, for example, by means of a stationary detection device (not illustrated), along which the pipe section 102 is guided, or by means of the second handling device 50, which can be moved relative to the first handling device. The second handling device can have a plurality of different work attachments, for example, of which the detection device would be one.

In a subsequent method step 5, a spatial penetration curve is then determined as a function of a superposition of the three-dimensional shapes of the first and second pipe sections, preferably by means of a computing unit 46. The spatial penetration curve serves as a central control variable for the subsequent method steps up to and including the welding of the pipe sections 101, 102 to one another.

The work attachments preferably each have the same point of action relative to the handling device, and therefore all the work attachments can be moved with the same path, namely along the common penetration curve, without additional programming effort being required.

Thus, on the basis of the penetration curve, in particular likewise by means of the computing unit 46, a cut contour in the connecting region of the first pipe section 101 and a cut contour in the connecting region of the second pipe section 102 are then determined.

In subsequent method steps 7a,b, edge surfaces are produced on the pipe sections 101, 102 by means of a cutting device, preferably by means of plasma cutting, in order to prepare for welding. The edge surfaces on the first pipe section 101 are preferably produced by means of the second handling device 50, which for this purpose receives a corresponding working head as a cutting device.

The edge surfaces on the second pipe section 102 are preferably produced by means of a stationary part of the cutting device or by means of the second handling device. In steps 7a,b, the pipe sections receive either edge surfaces 115 on one or both of their ends 103, 105 or edge surfaces 117 in a wall section at a distance from the respective ends 108, 110. If edge surfaces 117 are produced at a distance from the respective ends, a cutout 113 is produced in the wall 107 of a respective pipe section 101. The pipe slug which falls out is preferably collected in the interior of the pipe by means of a collecting container introduced into the first pipe section and is removed from the interior of the pipe.

In a further (optional) method step 9a, 9b, the first and second pipe sections 101, 102 are cleaned at the edge surfaces 115, 117. In one embodiment, cleaning is performed by means of a rotationally driven brush or a milling cutter. Cleaning the edge surfaces 115, 117 is intended, in particular, to remove as far as possible metal oxides and loose particles or burrs which have formed during plasma cutting to produce the edge surfaces.

In a next method step 11, the first pipe section 101 and the second pipe section 102 are aligned with one another. During alignment, the edge surfaces 115 of one pipe section 102 are aligned as closely as possible with the correspondingly formed edge surfaces 117 of the respective other pipe section 101. The second pipe section 102 can be aligned manually or by means of the automatically controlled handling device 52. If the first pipe section 101 has not yet been clamped, the clamping step is now carried out.

In a preferred embodiment, the second pipe section 102 is aligned with the clamped first pipe section 101 and held by the first handling device 101 until the pipe sections 101, 102 have either been tacked or fully welded. Tacking is preferably carried out by means of the second handling device 50, which, in turn, receives an appropriate working head for this purpose.

In a subsequent method step 13, the aligned pipe sections 101, 102 are welded to one another along the mutually aligned encircling edge surfaces 115, 117. Welding is preferably used to produce a fully encircling weld seam 109, which has a continuous root extending on the inside of the pipe sections 101, 102.

For collecting welding spatter, use is preferably made of the collecting container that was also used to collect the pipe slug, or of some other collecting container. The movement of the collecting containers is preferably under machine control.

Subsequently, after welding, the pipe sections that have been welded to one another are prepared in a method step 15 for subsequent coating. Step 15 comprises, for example, cleaning the welded pipe sections in one or more dip tanks, in which, for example, pickling agents or rinsing agents, such as demineralized water, can be held. The exact number and arrangement of operations in this step depends on the specifications of the coating material to be used.

The welded pipe sections 101, 102 prepared in step 15 are chemically coated in a next method step 17 in one or more dipping operations by means of an autodeposition method. Dipping ensures that the inside, including the weld seam or weld seams 109, but also the outside of the pipe element 100 are substantially fully coated.

Following the coating—method step 17—of the pipe sections 101, 102 and of the weld seam 109 connecting the pipe sections with a polymer-based layer 111, a thermal aftertreatment is carried out in step 19. In one embodiment of the method, method step 19 can comprise one or more sub-steps, in each of which a flash-off or annealing with predetermined temperatures and annealing durations takes place (low-temperature annealing or high-temperature annealing).

Optionally, the coated and already after treated pipe elements 100 which have been produced from the pipe sections 101, 102 can be powder-coated in a method step 21. The step 21 of powder coating can take place immediately after method step 17 or else after a preceding thermal aftertreatment according to step 19. According to a preferred embodiment of the method, a thermal aftertreatment according to step 19 is performed after the step 21 of powder coating in order to cure the powder coating produced.

In method step 23, the pipe element produced is then removed from the production process and, for example, sent to temporary storage.

For the sake of simplicity, method step 19 for the thermal aftertreatment of the pipe conduit elements is depicted as a single step. In method step 25, the pipe element 100 can pass through a plurality of successive heat treatment stages, which are carried out in one or more different temperature control devices.

With reference to FIG. 1, the method has been explained schematically. The pipe element 100 produced by the method, which has already been referred to above, is explained in more detail in FIGS. 2a, 2b. The pipe conduit element 100 shown in FIGS. 2a, 2b comprises a first pipe section 101 and a second pipe section 102.

At the location at which it is welded to the second pipe section 102, the first pipe section 101 has a cutout 113 (FIG. 3) in its side wall 107.

In the embodiment shown, the first pipe section 101 and the second pipe section 102 are connected by means of a single-layer, fully encircling weld seam 109.

The pipe element 100 has in its interior a polymer-based layer 111 which extends completely along the insides of the pipe sections 101, 102 and also completely covers the encircling weld seam 109 in the interior of the pipe element 109. If the pipe conduit element 100 has been coated in a dipping process, the outer surface of the pipe element 100 and thus of the first and second pipe sections 101, 102 as well as the weld seam 109 are also at least very largely covered by the polymer-based layer.

In the embodiment shown, the second pipe section 102 is arranged approximately centrally between a first end 108 and a second end 110 of the first pipe section 101. In the embodiment shown, the second pipe section 102 is aligned coaxially with the wall cutout 113 formed in the side wall 107 of the first pipe section 101. The second pipe section 102 and the first pipe section 101 are aligned at an angle α to one another, which is 90° in the present embodiment.

Depending on the specifications relating to the pipe element, the angle α can also be in a range between 30 and 90 degrees. In the embodiment shown in FIGS. 2*a* and 2*b*, the first pipe section 101 is a base pipe and the second pipe section 102 represents a connection element.

In the present embodiment, the first pipe section 101 has a diameter which is different from the diameter of the second pipe section 102. The diameters of the first and second pipe sections 101, 102 can also be identical.

The two pipe sections 101, 102 are fixed relative to one another during welding, in particular using a clamping device explained in more detail below and a handling device, in order to ensure a constant gap clearance between the pipe sections. This facilitates the creation of a weld seam 109 with complete root fusion of at least the edge surface 115 of the second pipe section 102 or even of the edge surfaces 115, 117 of both pipe sections 102, 101.

Figure 2A:
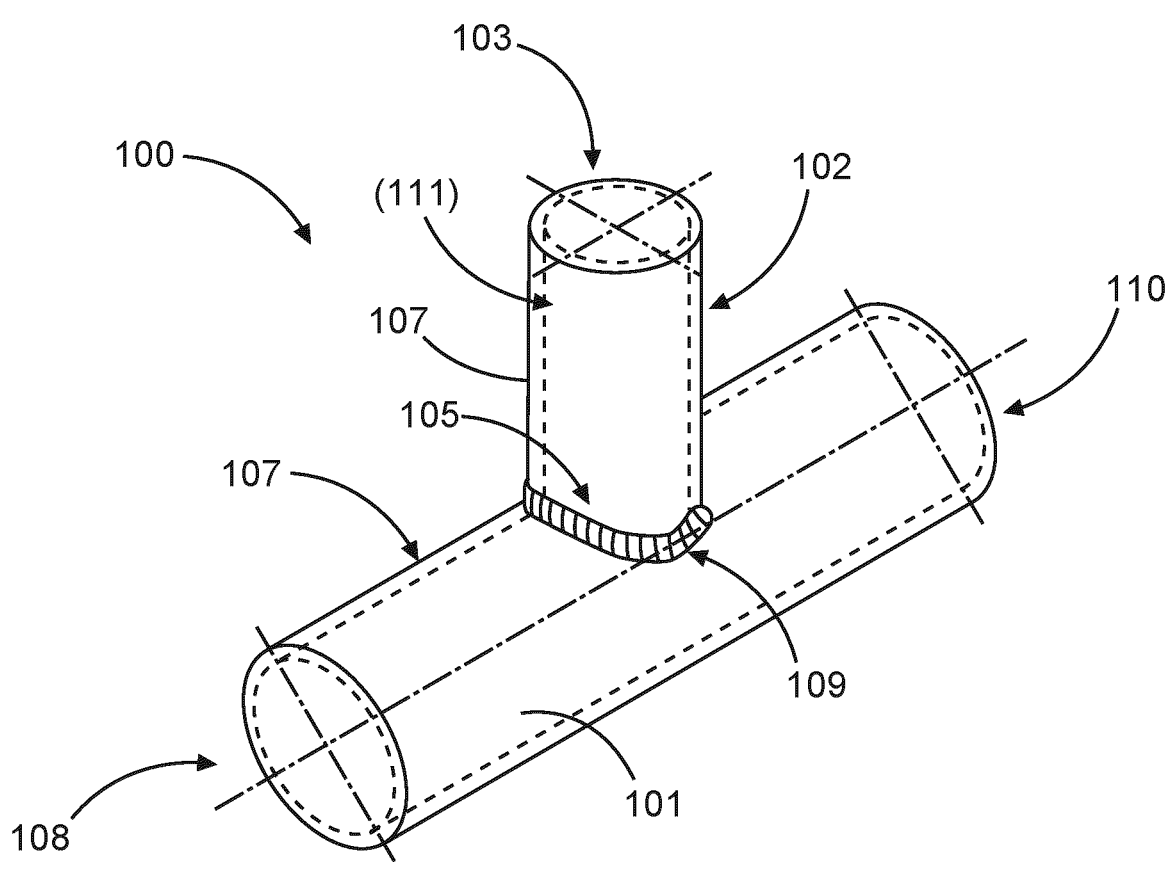
FIG. 2a shows a schematic three-dimensional representation of a pipe element produced by the method according to FIG. 1.
Figure 2B:
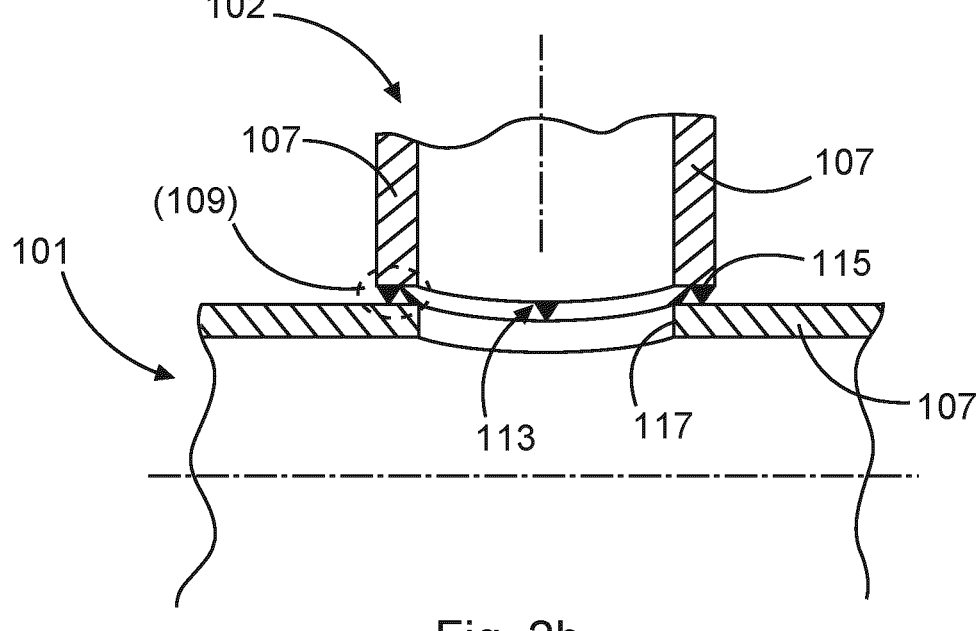
FIG. 2b shows a partial view of a pipe element according to the invention according to FIG. 2a in section.
Figure 3A:
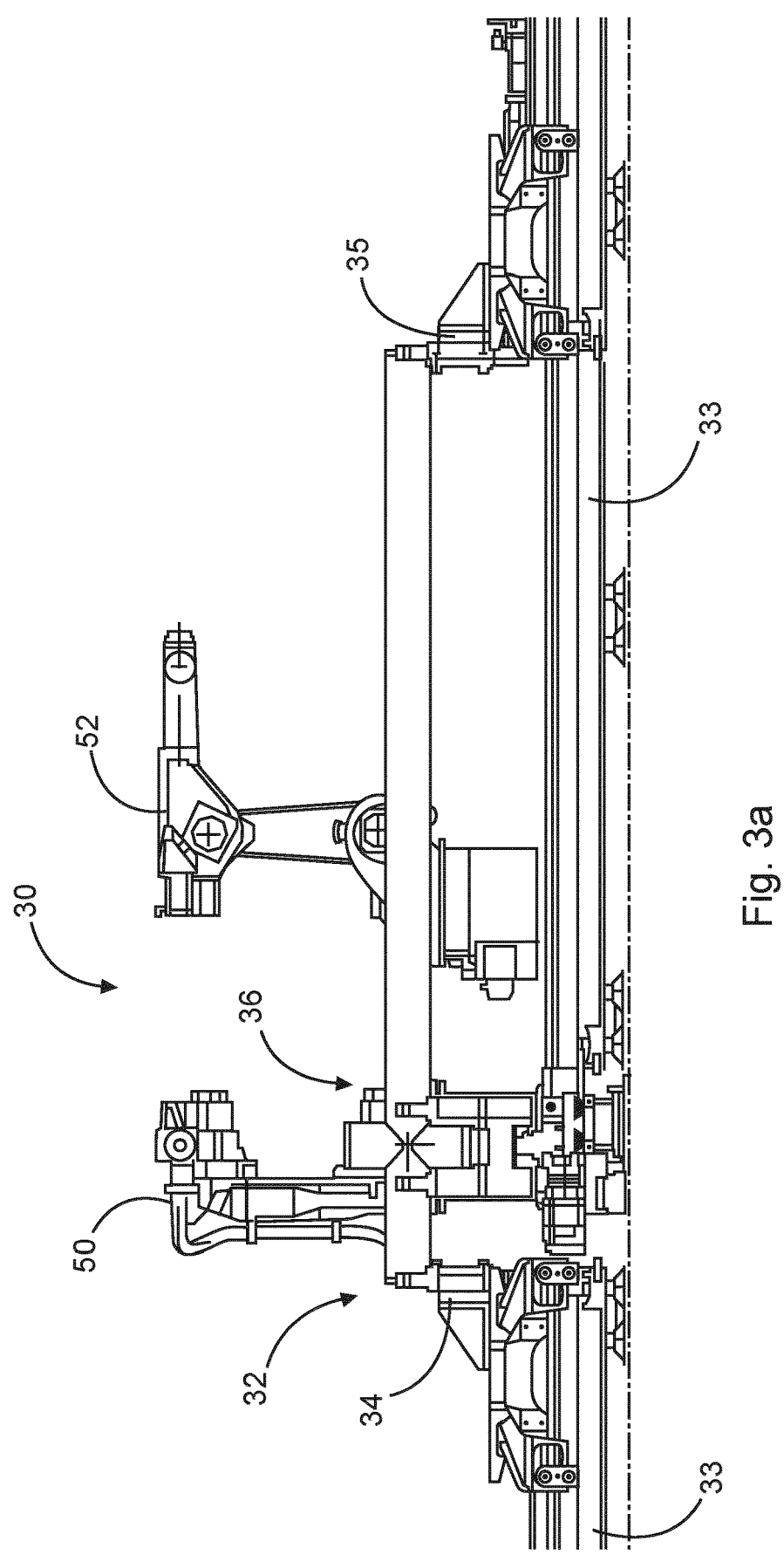
FIG. 3a, b show overall views of the apparatus according to the invention for producing a pipe conduit element from the front and the side.
Figure 3B:
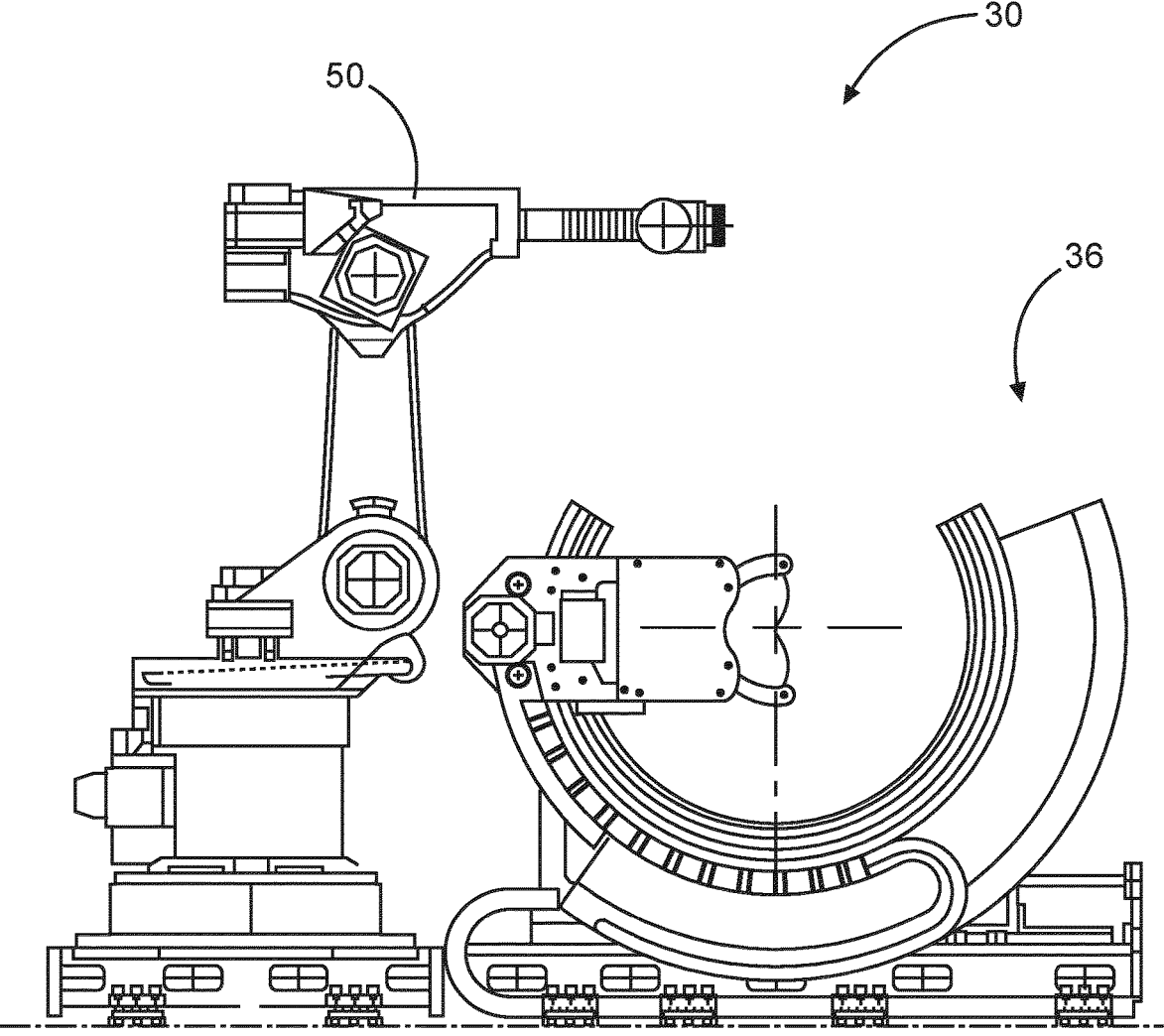
Figure 4A:
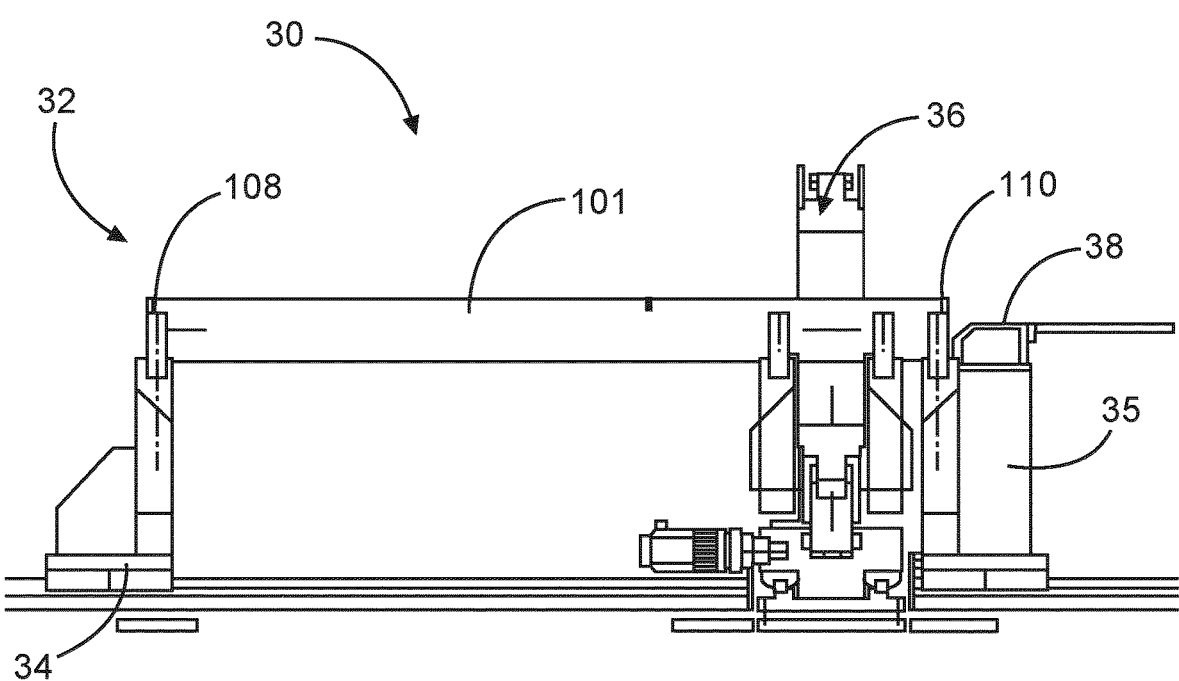
FIGS. 4a-9b show partial views of the apparatus according to the invention for producing a pipe conduit element in various steps according to one embodiment of the method according to the invention.
Figure 4B:
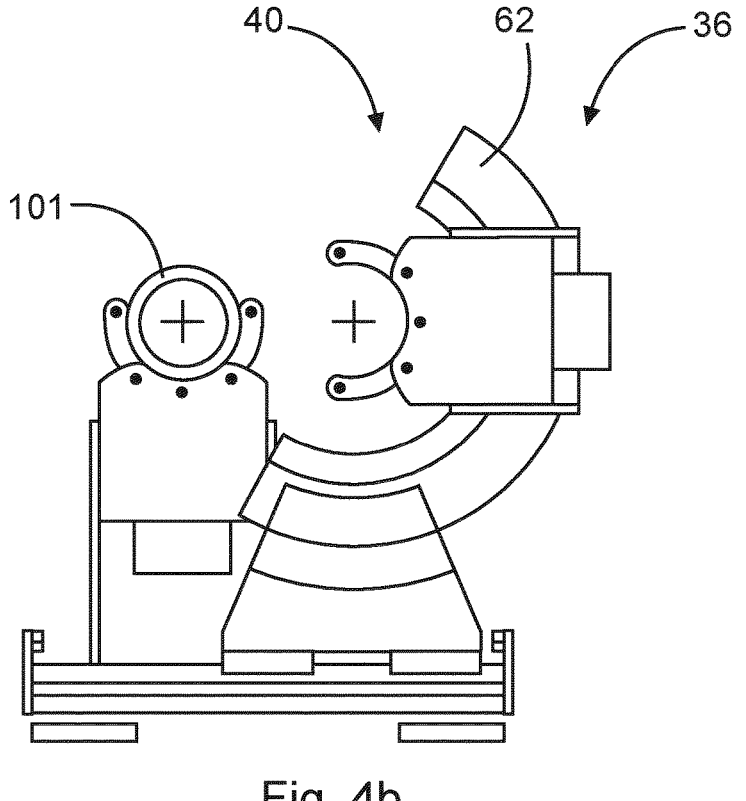

FIG. 3*a,b* show schematic views of an apparatus 30 for producing a polymer-enhanced pipe element 100 shown by way of example in FIGS. 2*a* and 2*b*. The apparatus 30 comprises a supporting device 32 with rails 33, along which supporting parts 34, 35 for receiving the first pipe section 101 can be moved. An angular positioner 36 for the first pipe element 101 is arranged in a section between the rails 33.

In one embodiment, the apparatus 30 comprises a first handling device 52 and a second handling device 50, preferably both designed as handling robots, the exact functioning of which will be described in detail below.

FIGS. 4 to 9 show partial views of the apparatus 30 during various production steps of the polymer-enhanced pipe element 100. The apparatus 30 comprises a supporting device 32, which has two supporting parts 34, 35, which are configured to receive the ends 108, 110 of the first pipe section 101. The angular positioner 36, which is still in a waiting position, is arranged along a section of the supporting device 32, see FIGS. 4*a*, 4*b*. For the sake of clarity, the handling devices 50, 52 are shown below in abstract form in the drawings.

Figure 5A:
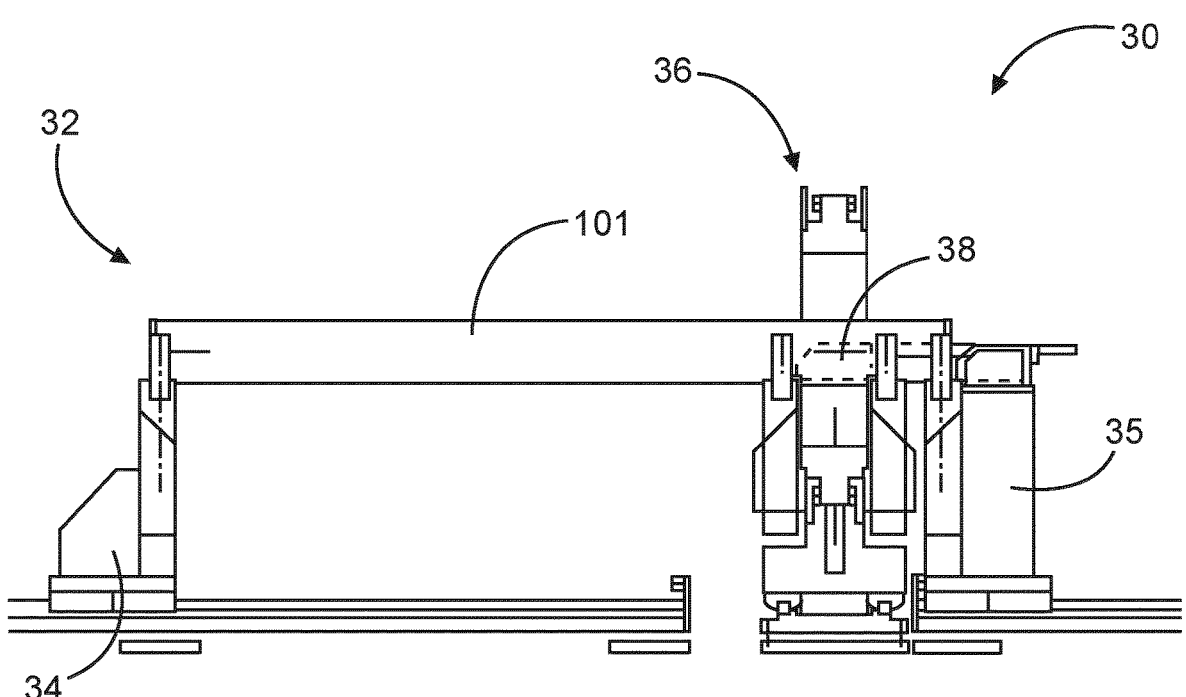
Figure 5B:
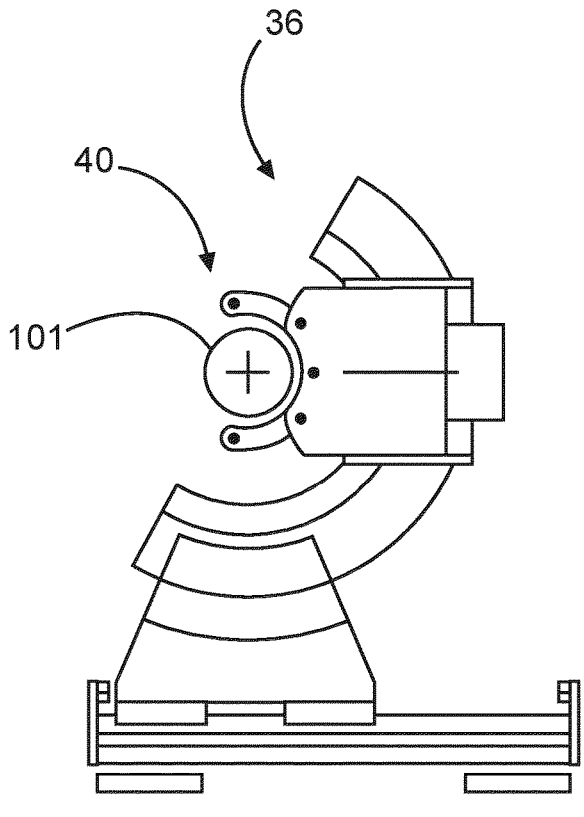

As FIGS. 5*a, b* and 6*a, b* show, the angular positioner 36 is then transferred into a working position, namely into a region close to the first pipe section 101 (FIG. 5*b*), wherein the angular positioner 36 is preferably movable transversely to the rails 33 and thus transversely to the longitudinal axis of the first pipe element 101. The supporting device 32 moves into a predetermined position with the received first pipe section 101 relative to the angular positioner 36 such that a section in which a connecting region is to be produced on the first pipe section 101 is arranged centrally with respect to the angular positioner 36.

In addition, in one embodiment of the present invention, a sacrificial shell 38 is introduced into the interior of the first pipe section 101 to the position at which the region of connection to the second pipe section 102 is to be formed. The sacrificial shell 138 serves in particular for collecting residues which contaminate the inside of the first pipe section and which arise during the subsequent processing of the first and second pipe sections 101, 102 and are described in more detail, for example, in WO2020/002486A1.

Figures 6A, 6B:
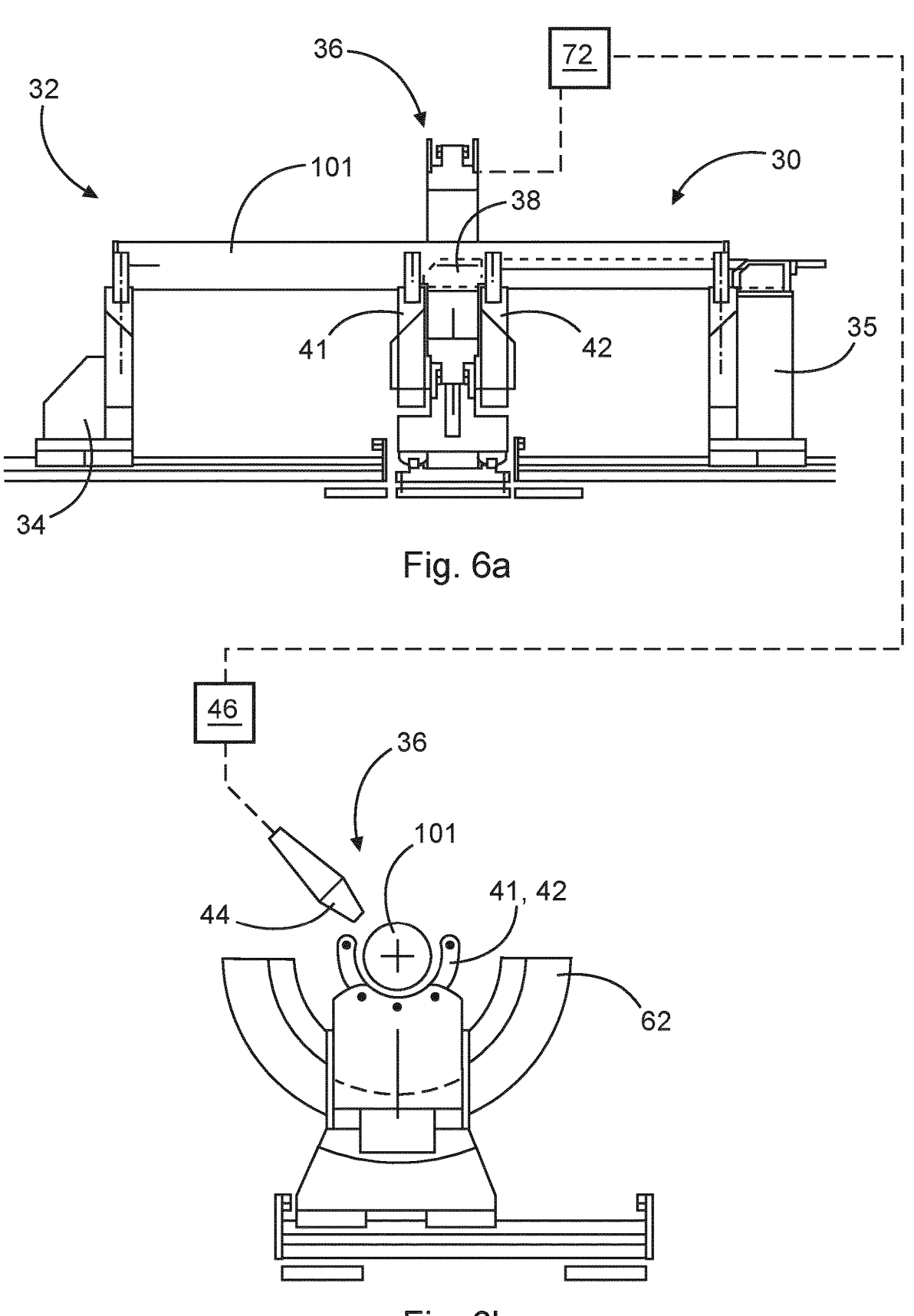

As FIG. 6*a, b* furthermore show, the first pipe section 101 is then clamped by the angular positioner 36. Clamping is accomplished by means of a clamping device 40 which is present on the angular positioner 36 and which comprises two clamping means 41, 42, which act on the first pipe section 101 on both sides of the connecting region to be produced. The clamping means are designed as 3-point grippers. This ensures that the first pipe section 101 to be received is clamped with its central axis almost coaxial with the clamping center of the clamping means 41, 42. With the clamping by the angular positioner 36, a previous clamping force, which was applied to the supporting parts, can be canceled, thus making the first pipe section 101 movable at least relative to certain sections of the supporting parts 34, 35 of the supporting device 32.

In a preferred embodiment of the invention, the apparatus 30 has a detection device 44 which is configured to detect a three-dimensional shape in the connecting region of at least the first pipe section 101. The surface of the first pipe section 101 is scanned by the detection device 44 in order to determine tolerances in the form of any non-circularities in this section of the pipe section 101.

By means of the detection device 44 or a separate detection device, for example a stationary detection device, the three-dimensional shape in the connecting region of the second pipe section 102 is likewise detected. The second pipe section 102 is gripped and positioned by means of the handling device 52.

By means of a computing unit 46 coupled to the detection device 44 in a signal-transmitting manner, a spatial penetration curve is then determined as a function of a superposition of the detected three-dimensional shapes of the first and second pipe sections 101, 102, and cut contours of the first and second pipe sections 101, 102 are determined on the basis of the penetration curve determined.

The cut contours are transmitted from the computing unit 46 to a cutting device 48, by means of which edge surfaces 115, 117 (FIG. 3) that are matched to one another are produced on the first and second pipe sections 101, 102.

Figures 7A, 7B:
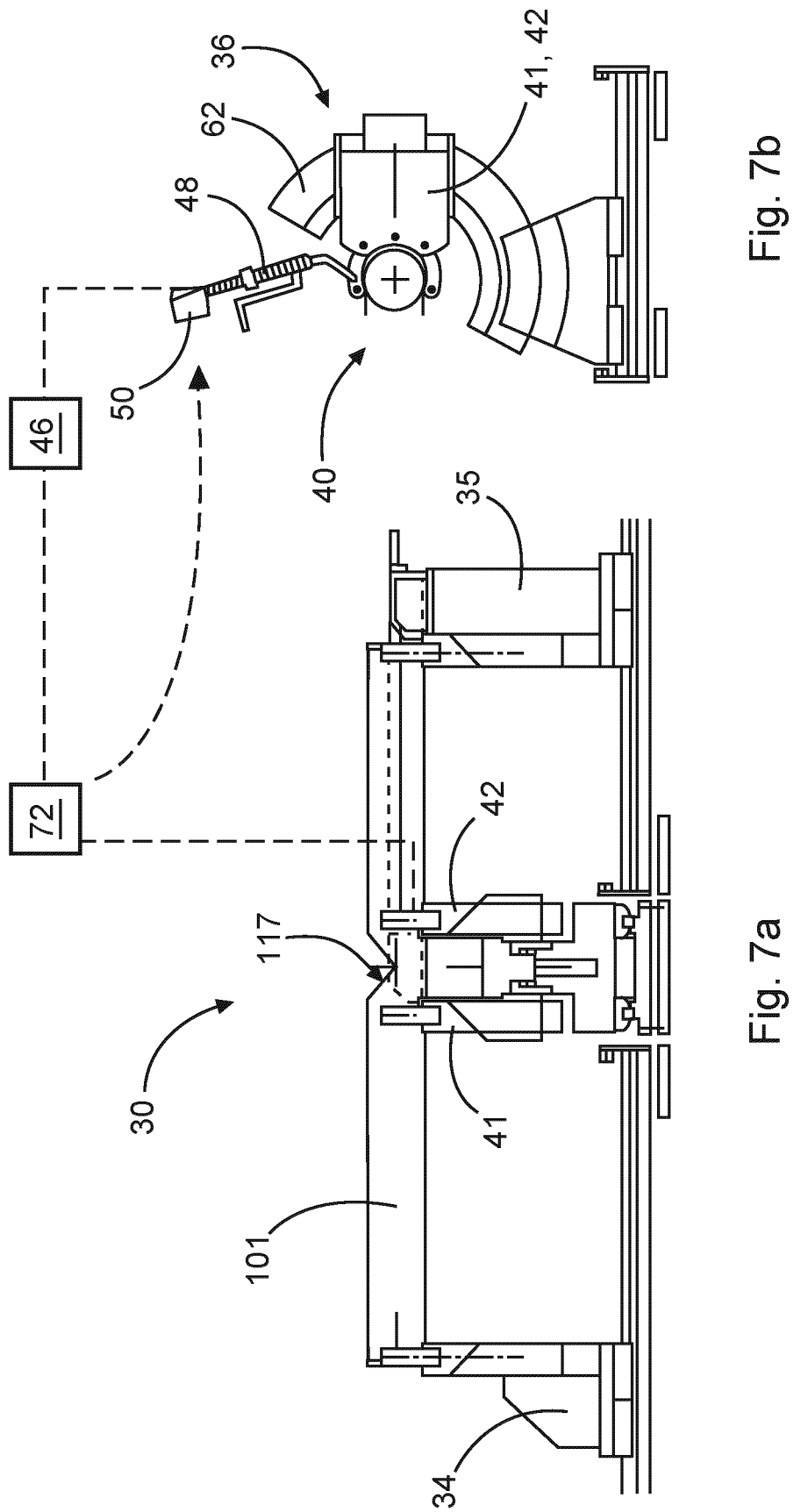

In the present embodiment of the apparatus, which is shown in FIG. 7*a,b*, the cutting device 48 is designed as a processing attachment for an automatically controlled handling device 50, such as a robot, for example. In the embodiment shown, the handling device 50 carries out all the processing operations on the first pipe section 101 using corresponding detection and processing attachments of the apparatus. The handling device 50 also assumes the task of welding the first and second pipe sections 101, 102 to the pipe element 100 by means of a welding attachment.

Figure 8A:
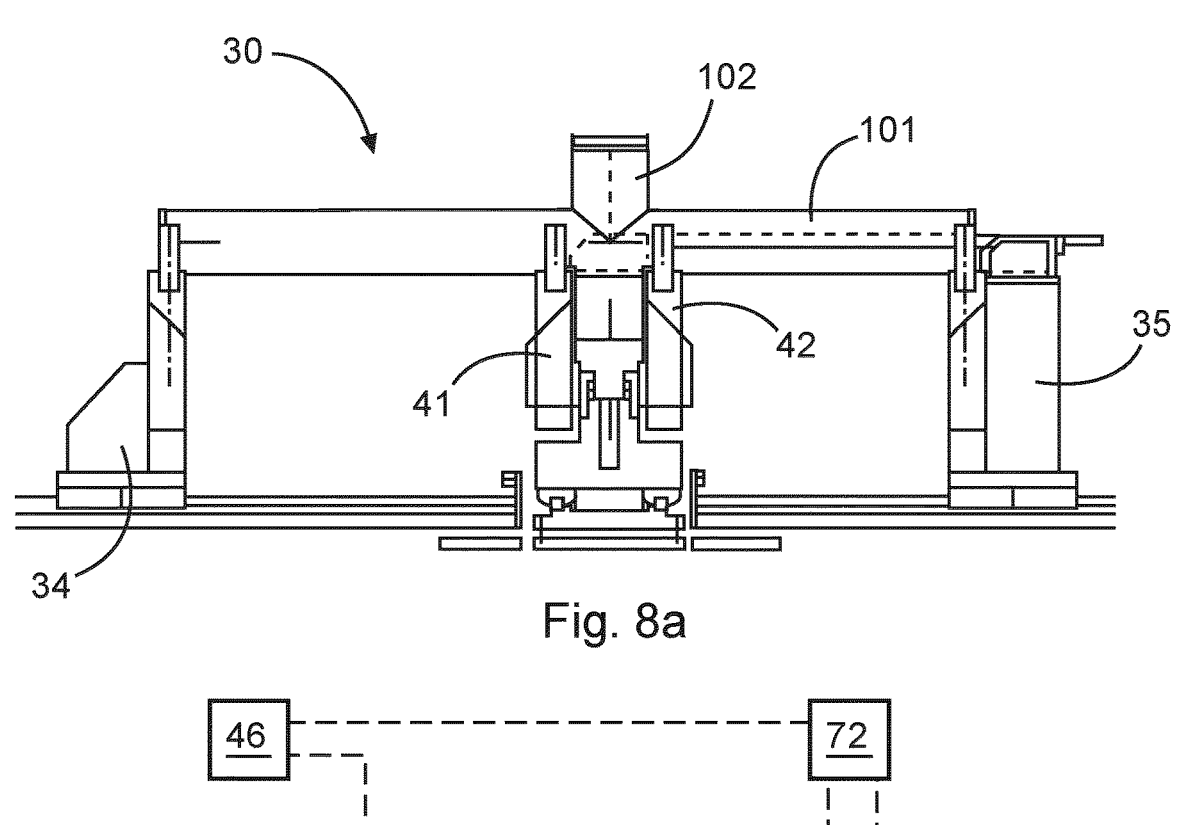
Figure 8B:
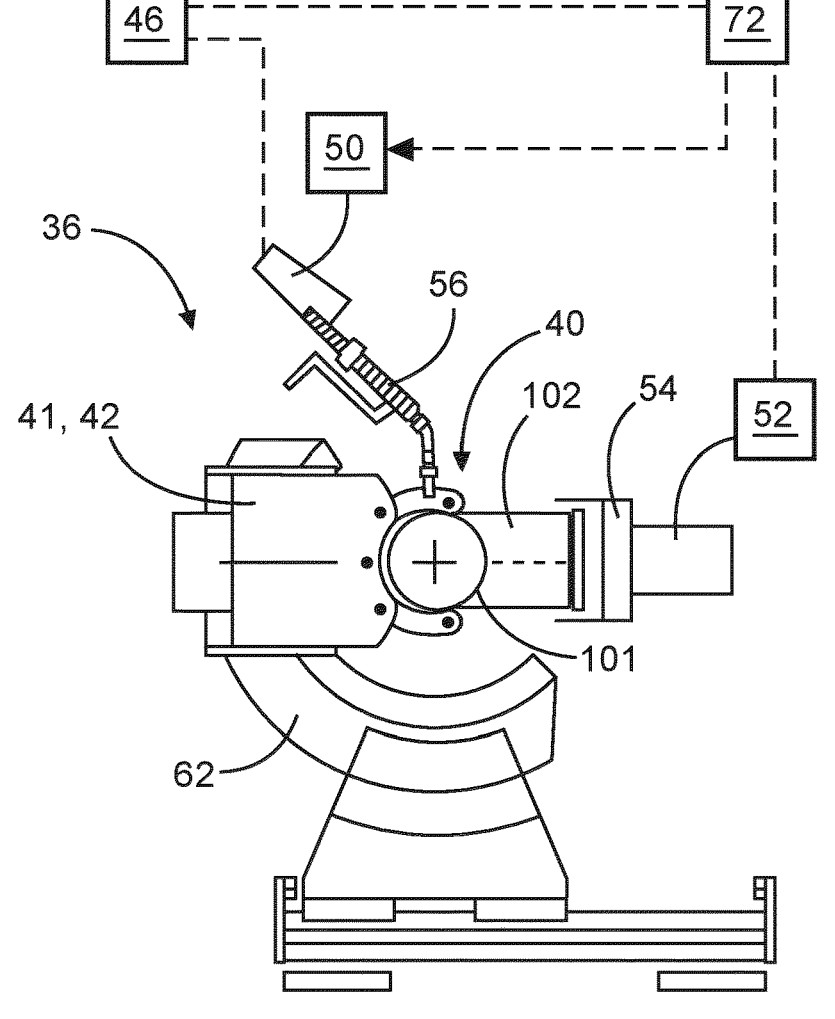

As can be seen from FIG. 8*a, b*, the correspondingly designed pipe section 102 is subsequently aligned with the first pipe section 101 by means of the automatically controlled handling device 52.

In a preferred embodiment of the invention, the first and second pipe sections 101, 102 are then welded to one another by means of a welding device 56, which is preferably arranged as a processing attachment on the handling device 50.

In one embodiment, the pipe sections 101, 102 are welded to one another along the mutually aligned edge surfaces 115, 117. In a preferred embodiment of the invention, the edge surfaces produced during cutting are welded to one another along the spatial penetration curve determined.

In the present case too, a single-layer encircling weld seam 109 is preferably produced. During the entire processing operation, any processing residues that may arise, such as welding spatter, are collected by the sacrificial shell 38 arranged in the interior of the first pipe section. Preferably, any processing on the first pipe section 101 takes place in the trough position. The trough position should be understood to mean that processing takes place from above, irrespective of whether cutting or welding is carried out, and therefore any processing residues which may arise can then fall downward into the sacrificial shell. For this purpose, the first pipe section 101 is always rotated into the corresponding angular position.

Figure 9A:
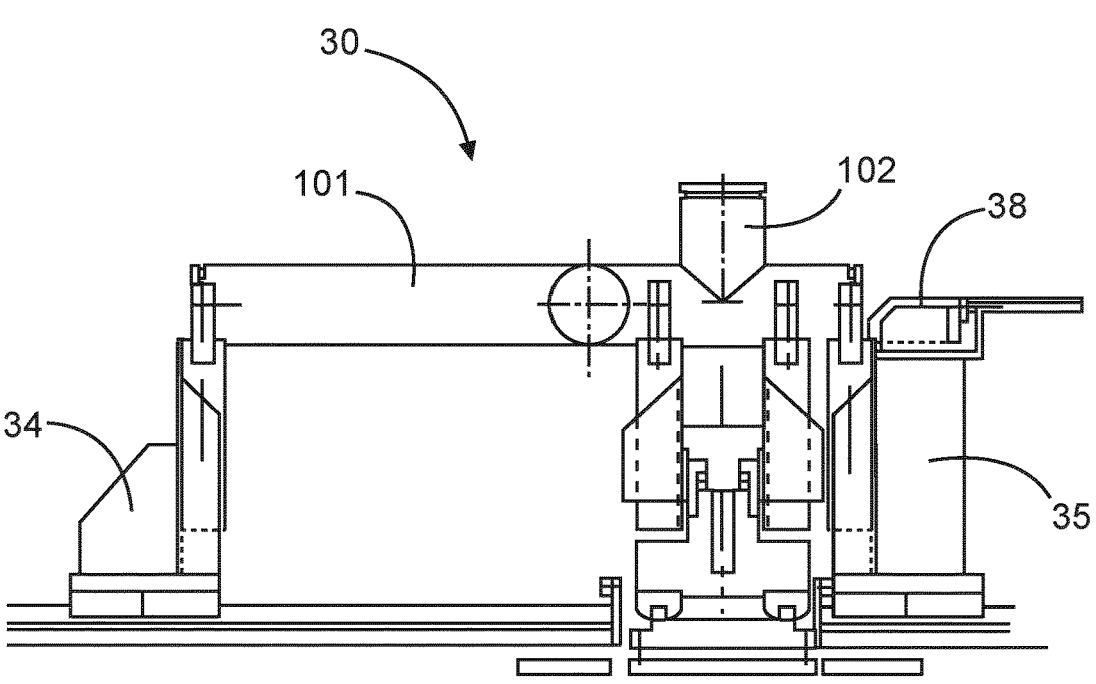
Figure 9B:
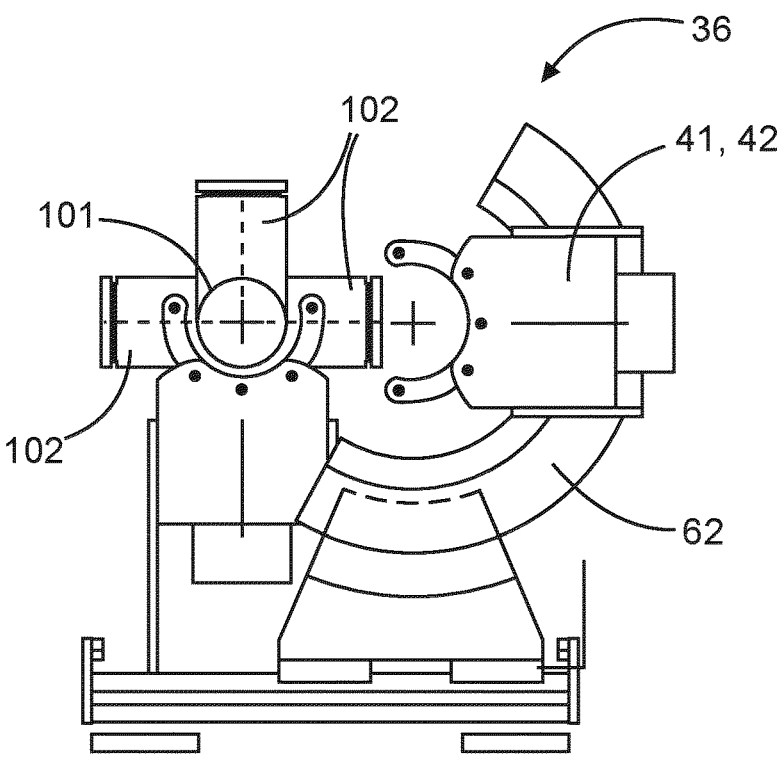

As can be seen from FIG. 9*a, b*, a plurality of, two or three such pipe sections 102 can be arranged on a first pipe section 101 at predetermined intervals along its longitudinal axis. The pipe element 100 produced thus has a plurality of branches on the pipe section 101.

After the production of such a pipe element 100, the clamping device 40 of the angular positioner 36 is released, thereby freeing the pipe section 101. After release by the clamping means, the angular positioner 36 moves back from the working position into its rest position at a distance from the pipe section 101.

The clamping means 41, 42 of the clamping device 40 are received on the angular positioner 36, in particular in such a way that they can be moved around an axis of rotation 60, in particular along an adjusting device 58. With the movement of the clamping means 41, 42, the first pipe section 101 is moved coaxially about a tool center point (TCP). The tool center point is formed by the clamping center of the clamping means 41, 42 of the angular positioner 36 and coincides with the axis of rotation 60. The more detailed functioning of the angular positioner is described below in the embodiment of the angular positioner 36 shown in FIG. 10.

Figure 10:
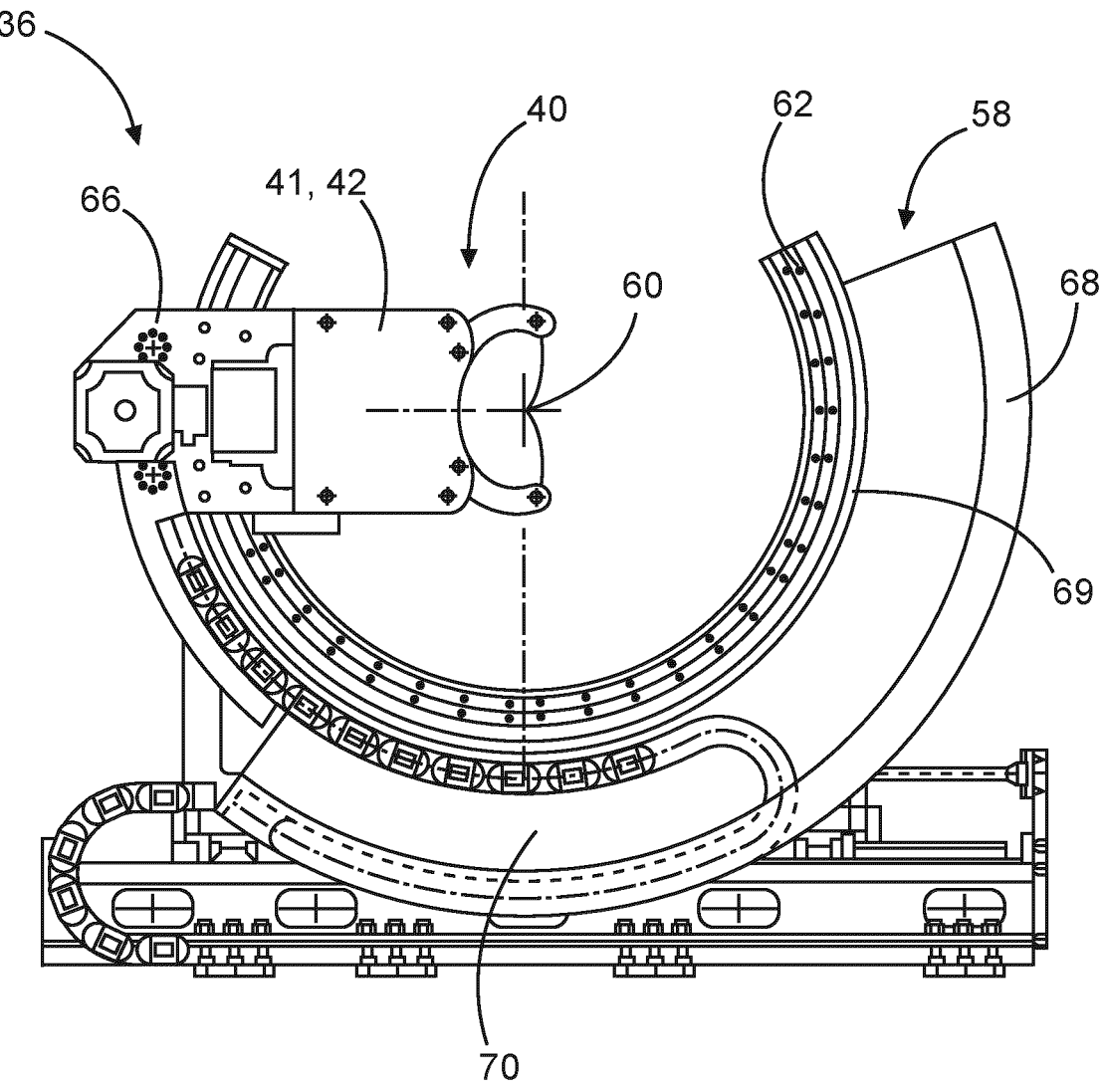
FIG. 10 shows a detail view of the apparatus according to the invention with its angular positioner for receiving and moving a first pipe section.

FIG. 10 shows a detail drawing of the angular positioner 36 in order to explain the functioning and construction of the clamping device 40 receiving the first pipe section 101. The clamping device 40 comprises clamping means 41, 42, by means of which the first pipe section 101 is clamped on an axis of rotation 60 of the angular positioner 36 on both sides of a connecting region on the first pipe section 101. The axis of rotation 60 also forms the tool center point (TCP), which is used as a starting point for the processing of the first pipe section 101 and the step of welding the first and second pipe sections 101, 102 to one another, and which preferably serves as a reference axis for the spatial penetration curve.

The clamping means 41, 42, together with the clamped first pipe section 101, are moved on a circular path about the axis of rotation 60 of the angular positioner 36. An arcuate guide 62 is assigned to the first clamping device 40 for each clamping means 41, 42. The guide 62 preferably has a rail body 64 in the form of a ring segment.

The clamping means 41, 42 are arranged on a guide surface 65 facing the axis of rotation 60 for the first pipe section 101. The clamping means 41 move about their defined clamping center, which coincides with the axis of rotation 60 of the angular positioner and the tool center point (TCP) of the apparatus. The clamping means 41, 42 are coupled to a drive unit 66 for controlled movement relative to the guide rail 62.

In one embodiment of the apparatus 30 according to the invention, the rail body 64 is designed as a ring segment and extends over an angular range of approximately 180° to approximately 270°, preferably an angle of approximately 240°. This enables the first pipe section to be moved in the radial direction with respect to the axis of rotation 60 of the angular positioner 36, facilitating the reception and removal of the first pipe section 101.

In a further embodiment of the apparatus, it is envisaged that the adjusting device 58 has a receptacle 68 for each annular guide rail 62, in which receptacle the guide rail 62 is on a guide surface 69 facing away from the axis of rotation 60, and thus, in addition to the clamping means 41, 42 movably received on the guide rail 62, a more flexible adjustment capacity is created for the pipe section 101.

A further drive unit 70 for a controlled movement of the guide rail 62 relative to the receptacle 68 is provided on the receptacle 68. For receiving purposes, the guide rail can be moved by more than 90 angular degrees, preferably by more than 180 angular degrees, as a result of which the clamping means can be moved on a full circular path about the axis of rotation 60, despite the accessibility in the radial direction to the angular positioner. The pipe section to be processed can thus be processed over its entire circumference.

The method according to the invention and the apparatus according to the invention are preferably operated in a partially or completely computer-controlled manner.

For this purpose, the apparatus 30 preferably has a machine controller 72. The machine controller is preferably connected in a signal-transmitting manner to the handling devices 50, 52 and the clamping device 40, to the detection, cutting and welding device or devices (if present in addition to the handling devices), the computing unit 46, and, as a further preference, to additional peripheral devices, such as a collecting device, which controls the collecting container for the pipe slug and the welding splatter.

The machine controller 72 can have a central control logic or comprise one or more sub-controllers. The machine controller 72 can directly control the various working devices or can cooperate with the controllers of these devices via corresponding protocols. The machine controller is configured to output control commands for carrying out the method described hereinabove in its preferred embodiments and preferably to receive inputs from an operator by means of a human-machine interface. The machine controller 72 preferably has a data interface for communication with a storage medium, which contains a computer program product which, in turn, contains the control commands for carrying out the method.

Identical or similar components are denoted by the same reference signs.

Having already explained the basic process sequence with reference to the above figures, the terminology of the common penetration curve will be explained again with reference to FIG. 11. The initial starting point is an idealized pipe element, in which the first pipe section 101 and the second pipe section 102 have an idealized contour KID, in which the two pipe sections 101, 102 are each cylinders.

In reality, however, the first pipe section 100 does not normally have a perfect cylindrical shape but a shape which deviates therefrom, this being expressed in the non-cylindrical surface $K_1$, which is subject to tolerances. In the method according to the invention, the surface $K_1$ is detected as a family of points. The family of points is characterized either by means of absolute coordinates or by means of deviations from the idealized cylindrical shape.

In the same way as the first pipe section 101, the second pipe section 102 also does not have an ideal cylindrical shape but a surface $K_2$ which deviates from the ideal cylindrical shape, this likewise being characterized as a family of points in accordance with its metrological detection.

The common spatial penetration curve D results from an intersection of the two surfaces or families of points $K_1$ and $K_2$. In other words, those coordinates which are present both in $K_1$ and in $K_2$ lie on the common spatial penetration curve.

Figure 11:
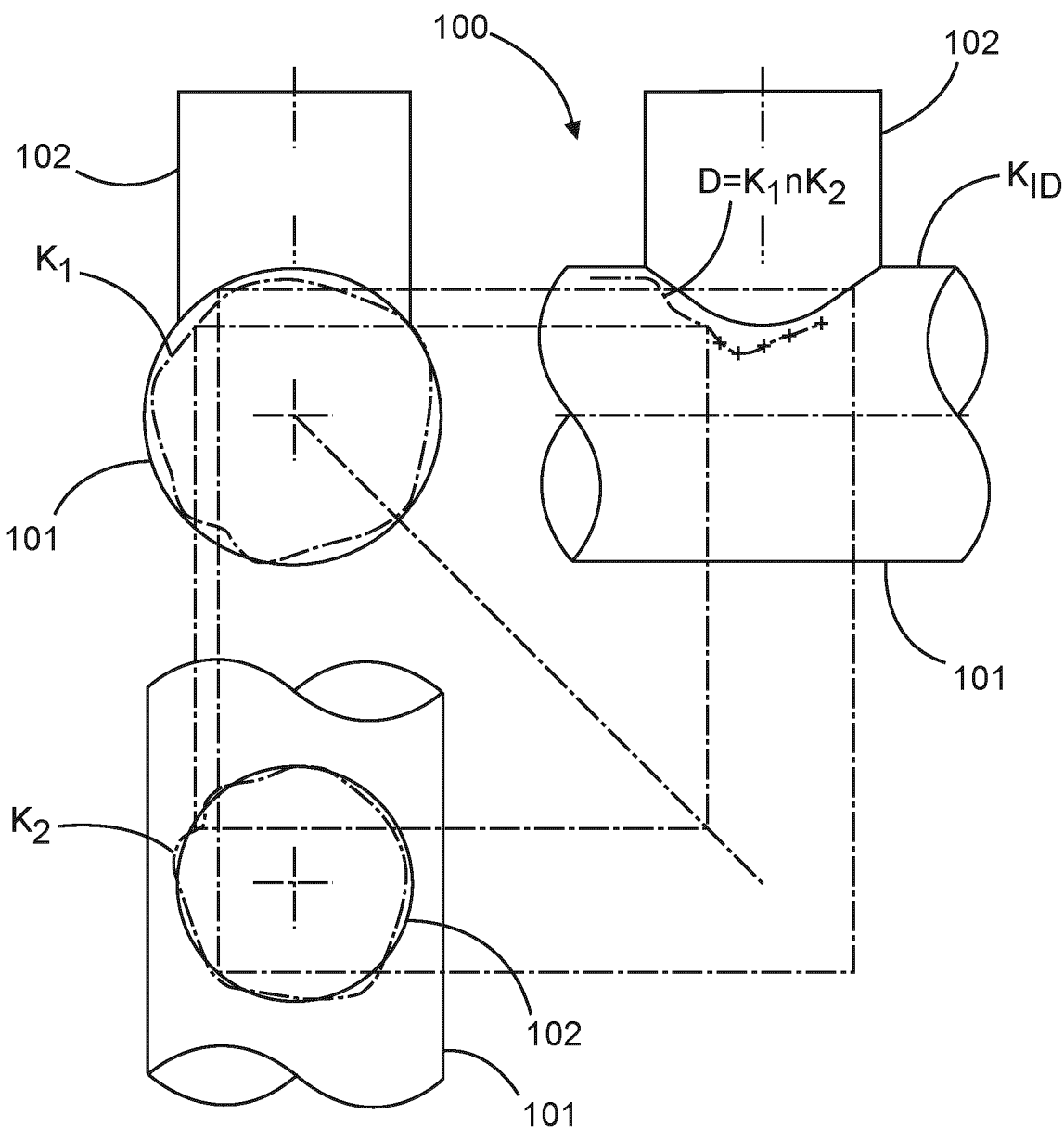
FIG. 11 shows a schematic illustration for determining the spatial penetration curve.

To prepare the pipe sections 101 and 102 before the welding process, the cut surfaces are produced by introducing into the first pipe section 101 an aperture along the common penetration curve D, which would correspond to the projection of $K_2$ as viewed from above (at the bottom left in FIG. 11). A cut surface is introduced into the end of the second pipe section 102, and, when viewed from the side (at the top left in FIG. 11), this surface corresponds to the projection of $K_1$. The two pipe sections 101, 102 prepared in this way can then be positioned relative to one another and welded along the common penetration curve D with guidance by means of a handling robot. The step of welding is particularly preferably carried out in a single continuous movement, in which the welding device is applied to an application point and traverses the common spatial penetration curve D without disengaging until the weld seam is completed, when the application point has been reached again. Owing to its regularity, both on the outside of the pipe element and on the inside in the region of the weld root, the weld seam produced in this way is optimally prepared for subsequent polymer enhancement.

LIST OF REFERENCE NUMERALS:

| 1a, b | Provision of the pipe sections |
| 3a, b | Detection of the three-dimensional shape |
| 5 | Determination of the spatial penetration curve/cut contours |
| 7a, b | Generation of edge surfaces |
| 9a, b | Cleaning of the edge surfaces |
| 11 | Alignment of the pipe sections |
| 13 | Welding of the pipe sections |
| 13.1 | Measurement |
| 13.2 | Selection of parameters |
| 13.3 | Reading in of the parameters |
| 13.4 | Tack welding of the pipe sections |
| 15 | Preparation of the pipe element |
| 17 | Coating of the pipe element |
| 19 | Aftertreatment |
| 21 | Powder coating |
| 23 | Flushing of the pipe element |
| 30 | Apparatus |
| 32 | Supporting device |
| 33 | Rails |
| 34, 35 | Supporting part |
| 36 | Angular positioner |
| 38 | Sacrificial shell |
| 40 | Clamping device |
| 41, 42 | Clamping means |
| 44 | Detection device |
| 46 | Computing unit |
| 48 | Cutting device |
| 50, 52 | Handling device |
| 56 | Welding device |
| 58 | Adjusting device |
| 60 | Axis of rotation/TCP |
| 62 | Guide rail |
| 64 | Rail body |
| 65 | Guide surface |
| 66, 70 | Drive unit |
| 68 | Receptacle |
| 69 | Guide surface |
| 72 | Machine controller |
| 100 | Pipe element |
| 102 | Second pipe section |
| 101 | First pipe section |
| 103, 105 | End |
| 107 | Side wall |
| 108, 110 | End |
| 109 | Weld seam |
| 111 | Coating |
| 113 | Cutout |
| 115, 117 | Edge surfaces |

The invention claimed is:

1. A method for the automated or partially automated production of a pipe element for polymer-enhancement using pipe sections subject to tolerances, comprising the following steps:

providing a first pipe section and a second pipe section, wherein the pipe sections each have a connecting region, which is provided for connection to the respective other pipe section;

detecting a three-dimensional shape of the first pipe section and a three-dimensional shape of the second pipe section, in each case in the connecting regions;

determining a spatial penetration curve as a function of a superposition of the three-dimensional shapes, determining a cut contour in the connecting region of the first pipe section and a cut contour in the connecting region of the second pipe section, in each case as a function of the penetration curve;

generating edge surfaces in the connecting regions of the first and second pipe sections along the respective cut contours, wherein the edge surface of the first pipe section defines a cutout through a wall of the first pipe section, and wherein the edge surface of the second pipe section is formed on an end of the second pipe section;

aligning the generated edge surfaces of the pipe sections with respect to one another; and welding the first and second pipe sections along the mutually aligned edge surfaces along the determined spatial penetration curve.

2. The method as claimed in claim 1, wherein the step of determining the three-dimensional shapes comprises:

providing an idealized model of the first pipe section and an idealized model of the second pipe section, and determining deviations of the detected three-dimensional shapes of the pipe sections from their respective model.

3. The method as claimed in claim 2, wherein the step of determining the spatial penetration curve comprises:

providing or generating an idealized penetration curve as a function of the idealized models, and generating the spatial penetration curve by applying the deviations of the three-dimensional shapes to the idealized penetration curve.

4. The method as claimed in claim 2, wherein the step of determining the three-dimensional shapes comprises:

determining families of points for both pipe sections, wherein the families of points are situated on the respective surface of the connecting regions and characterize the three-dimensional shape of the pipe sections in the connecting regions; and wherein the step of determining the spatial penetration curve comprises:

forming the spatial penetration curve from the intersection of the families of points.

5. The method as claimed in claim 1, further comprising the step of:

clamping the first pipe section by a clamping device in such a way that the first pipe section is received so as to be rotatable about an axis of rotation of the clamping device.

6. A polymer-enhanced pipe element, having a first pipe section and a second pipe section, which are connected to one another by a continuous weld seam and are coated with a polymer-based layer on the inside of the pipe and on the outside of the pipe, wherein the polymer-based layer is chemically bonded to the material of the pipe element, and contains a polymer-based autodeposition material, wherein the pipe element is further produced in a method as claimed claim 1.

7. An apparatus for the automated or partially automated production of a pipe element for polymer-enhancement using pipe sections subject to tolerances, wherein the pipe sections each have a connecting region, which is provided for connection to the respective other pipe section, wherein the apparatus comprises at least one detection device for detecting a three-dimensional shape in each case in the connecting regions;

a computing unit, which is configured to determine a spatial penetration curve as a function of a superposition of the detected three-dimensional shapes, and to determine cut contours in the connecting regions of the first and second pipe sections as a function of the penetration curve;

a cutting device for producing edge surfaces in the connecting regions of the first and second pipe sections along the respective cut contours, wherein the edge surface of the first pipe section defines a cutout through a wall of the first pipe section, and wherein the edge surface of the second pipe section is formed on an end of the second pipe section; and a welding device, which is configured to weld the first and second pipe sections to one another along the mutually aligned edge surfaces along the determined spatial penetration curve.

8. The apparatus as claimed in claim 7, comprising a clamping device for the first pipe section and a handling device for the second pipe section.

9. The apparatus as claimed in claim 8, wherein the clamping device comprises at least one clamping means and is configured to rotate the first pipe section about an axis of rotation.

10. The apparatus as claimed in claim 9, wherein the clamping means has a clamping center, which defines the axis of rotation of the clamping device.

11. The apparatus as claimed in claim 9, wherein the clamping means is a first clamping means, and the clamping device has a second clamping means, which is arranged at an axial distance from the first clamping means along the axis of rotation, wherein the clamping device is configured to clamp the first pipe section on both sides of the connecting region.

12. The apparatus as claimed in claim 11, wherein the clamping means is/are designed to be open on one side and is/are configured to receive and clamp the first pipe section from above.

13. The apparatus as claimed in claim 11, wherein the at least one of the clamping means is configured to fix the first pipe section, and wherein the clamping device is configured to pivot the clamping means in such a way that the first pipe section rotates about the axis of rotation.

14. The apparatus as claimed in claim 9, wherein the clamping device has an arcuate guide along which the clamping means is movably received, wherein the guide is aligned concentrically relative to the axis of rotation and is configured to guide the clamping means around the axis of rotation.

15. The apparatus as claimed in claim 8, wherein the handling device is a first handling device, and the apparatus further has a second handling device, which has a receptacle for various processing attachments.

16. The apparatus as claimed in claim 7, further comprising an electronic machine controller, which is connected in a signal-transmitting manner to the detection device, the computing unit, the cutting device, the welding device.

\* \* \* \* \*